Dec. 10, 1963  E. W. YETTER  3,114,102
POTENTIOMETER CONTROL SYSTEM
Filed Sept. 4, 1956  4 Sheets-Sheet 1
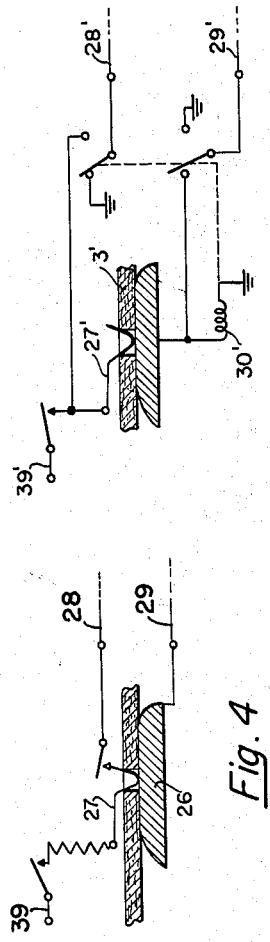
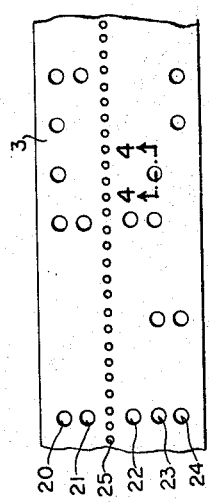
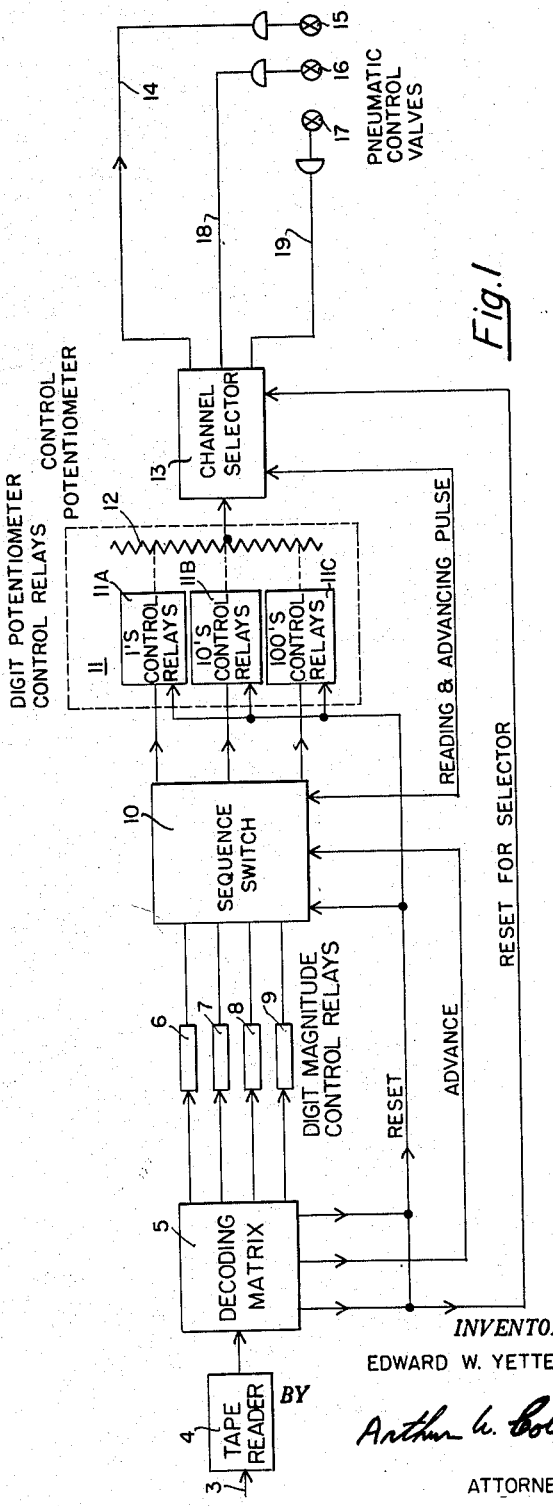
INVENTOR.
EDWARD W. YETTER
BY Arthur W. Collins
ATTORNEY

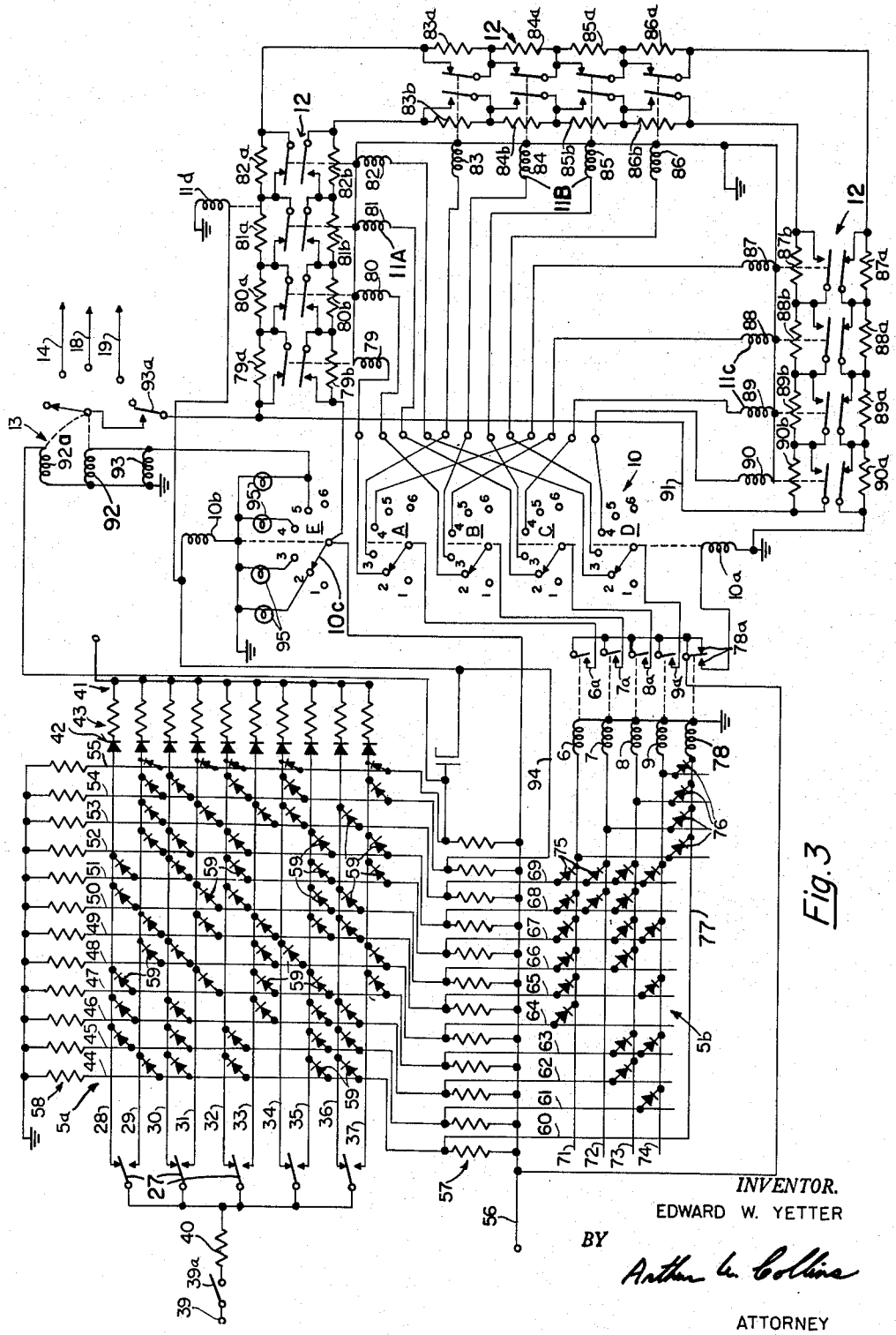

Dec. 10, 1963  E. W. YETTER  3,114,102
POTENTIOMETER CONTROL SYSTEM
Filed Sept. 4, 1956  4 Sheets-Sheet 4

INVENTOR.
EDWARD W. YETTER
BY
Arthur L. Collins
ATTORNEY

United States Patent Office 3,114,102
Patented Dec. 10, 1963

3,114,102
POTENTIOMETER CONTROL SYSTEM
Edward W. Yetter, West Chester, Pa., assignor to Burroughs Corporation, Detroit, Mich., a corporation of Michigan
Filed Sept. 4, 1956, Ser. No. 607,671
16 Claims. (Cl. 323—79)

This invention relates to remote control systems and more particularly contemplates the use of a conventional telemetering system for receiving metered data from an industrial machine or other suitable equipment, transmitting the data to a remote point where a predetermined computer operation is performed, and returning the results of the computer operation to the machine or other equipment for stabilization and for control thereof.

Telemetering systems of the conventional type in transmitting information or data between remote points ordinarily first receive the data to be transmitted, convert the same into a series of digitalized pulse type modulations of a carrier wave, then transmit the carrier to the remote point where the carrier is demodulated and the digitalized pulses are recorded in code on a punched tape or any other suitable recording medium. In order to then utilize the information recorded in this way upon the tape or other recording medium and provide suitable control of the industrial machine or the like, apparatus must be also made available to read the punched tape or other recording medium and decode the signals obtained therefrom.

It is therefore a principal object of the present invention to provide novel and improved apparatus for converting coded information into electrical control signals.

It is a further object of the present invention to provide novel and improved apparatus for utilizing the output signals of a conventional telemetering system to control a suitable machine, process or the like.

It is a further object of the present invention to provide novel and improved apparatus for converting coded data stored in the punched tape output of a conventional telemetering system into suitable control voltages for control of an industrial machine or process.

It is a still further object of the present invention to provide a novel and improved control system which is responsive to coded digital input signals for producing a succession of analog control voltages.

Other objects and many of the attendant advantages of the invention will be readily apparent as the same becomes better understood by reference to the following detailed description which is considered in connection with the accompanying drawings wherein:

FIGURE 1 is an overall functional diagram of a preferred embodiment of the present invention;

FIGURE 2 is a plan view of a portion of punched tape of the type preferably used in the present invention;

FIGURE 3 is a detailed schematic view of the embodiment of the invention shown in FIGURE 1;

FIGURE 4 is a cross sectional view of a preferred form of the tape reader shown in FIGURES 1 and 3;

FIGURE 5 is a cross sectional view of another preferred form of tape reader used in the present invention;

Figure 6:
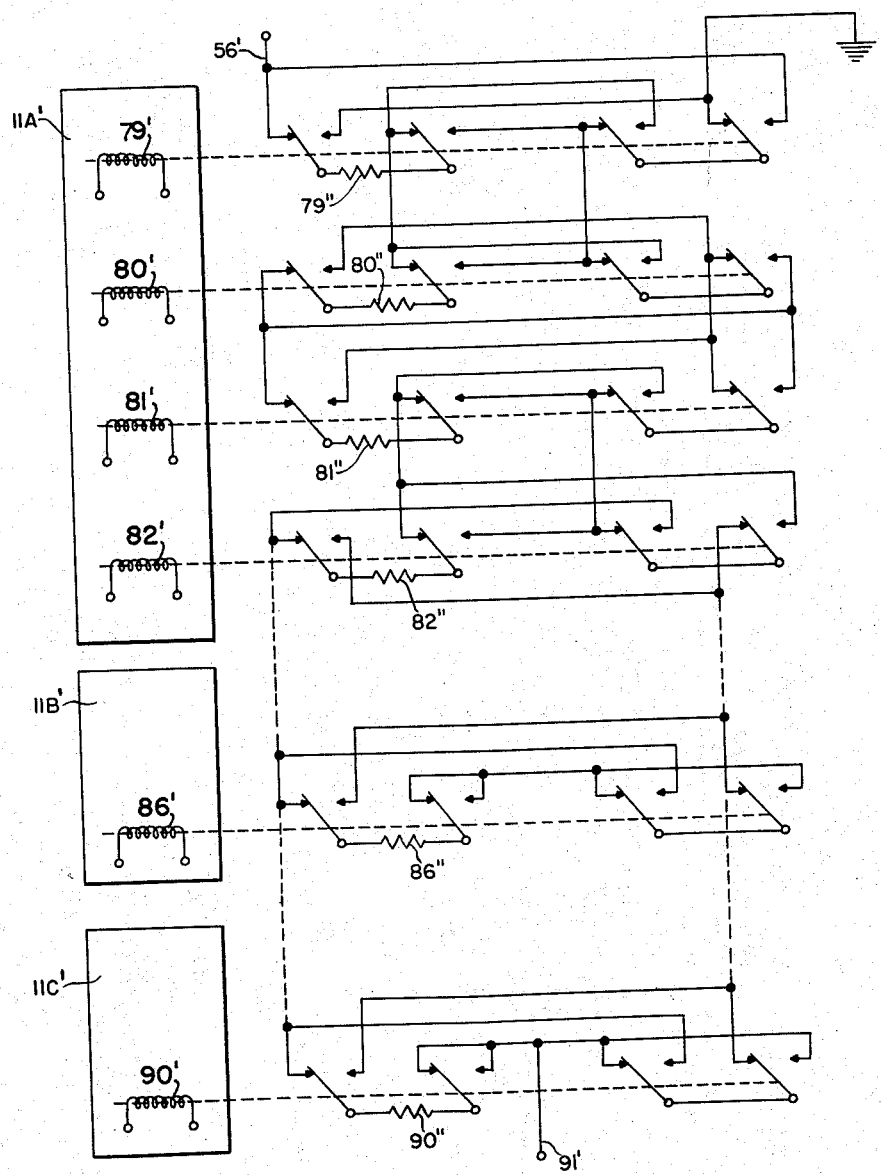
FIGURE 6 is a schematic view of a modified form of the potentiometer control device shown in FIGURE 3.

Both wired and radio transmission telemetering equipment utilize various coded systems of digital pulse type and modulation type to transmit information. Of the various conventional systems of this type that have been developed the Teletype or Baudot system is particularly reliable and efficient. The Baudot system uses five dot positions, wherein the presence or absence of the dots in the various positions are combined to provide a code for a wide range of input letters, numbers, timing or sequence signals, and programming cues. Paper tape with holes punched therethrough at selected dot locations provides an economical form of data storage for Baudot dot coded information. The tape can be "read" by feelers, which make electrical contact through the punched holes or by light transmission, or air flow through the tape holes, energizing one or more lines of a decoding matrix representing the five dot positions.

In lieu of the punched tape the coded data may be stored upon any other suitable medium such as by means of magnetic spots on a magnetizable recording medium which is capable of being sensed by appropriate magnetic heads. Moreover, while the Baudot data coding system is employed in the illustrated embodiment of the invention, it is to be understood that any other known coding system could be used to provide coded input data to a plurality of matrix input lines without departing from the spirit or scope of the present invention.

An overall view of a control system embodying the present invention is generally illustrated in FIGURE 1 of the drawing. As shown therein, the tape 3, upon which suitable control data has been stored, is fed into the tape reader 4 which converts the stored data on the tape into successive simultaneous groups of electrical pulses. These successive pulse groups of the tape reader are then fed into the matrix 5 where they are decoded and used to control energization of the various digit magnitude control relays 6–9. By means of the sequence switch 10, which is controlled by advancing pulses from the matrix 5, the state of energization of various elements of the "units," "tens," and "hundreds" windings of the potentiometer control relay device 11 is controlled one after another by each simultaneous group of pulses of the matrix 5 and the manner in which said pulses condition relays 6–9. After each of the potentiometer control relays 11A, 11B and 11C has been preconditioned and the effective setting of the electrical resistance of the potentiometer 12 has been determined, a reading pulse from the sequence switch 10 is delivered to the channel selector device 13 which reads through the potentiometer a control level electrical pulse of predetermined magnitude on output line 14. Control of a suitable pneumatic control valve or the like 15 by means of the magnitude of the electrical pulse on line 14 may be obtained thereafter in any suitable conventional manner. The sequence switch 10 and the potentiometer control relay device 11 are then reset to their original positions, the channel selector 13 is advanced to its next output line, as the cycle is repeated as described above for the next output pulse and control of the pneumatic devices or the like 16 and 17 on output lines 18 and 19.

A preferred embodiment of the present invention is illustrated in detail in FIGURES 2, 3 and 4 of the drawing. As shown therein, tape 3 which may be of paper or any other suitable material is perforated at one or more of the vertical aperture positions 20 through 24 along successive reading area portions of its length in accordance with any suitable code system such as the conventional Baudot dot code system. Apertures 25 in the tape are provided to receive teeth of a suitable sprocket wheel or the like for driving the tape between a base plate 26 and a spring biased contact member 27 associated with each of the vertical aperture positions. As will be more apparent hereinafter, depending upon the number and location of the various apertures along a given column reading area of the tape, various selected combinations of the row conductors 28 through 37 of the "and" matrix 5a are energized by the positive 10 volt supply line 39 through resistor 40. Thus, if as shown in FIGURES 2 and 3 of the drawings, tape 3 is punched at 23 and 24, conductors 35 and 37 and 28, 30 and 32 of the matrix 5a are energized by the supply line 39 through switch 39a and resistor 40 to cause lead 51 to be high. Switch or connector 39a is in series with the supply line 39 and closes only when the tape 3 is in position to be read. It then reopens as the tape progresses toward its next vertical column reading area. The opposite extremities of conductors 28 through 37 of the matrix 5a are respectively connected to the negative 25 volt supply line 41 through diodes 42 and resistors 43. The column conductors 44 through 55 of the matrix 5a are respectively electrically connected between the positive 25 volt line 56 and ground in individual series circuits that include resistors 57 and 58 which are preferably substantially equal in resistance.

Various row and column conductors of the matrix 5a are interconnected in a manner which will be more apparent hereinafter by diodes 59 such that energization of a predetermined combination of row conductors of the matrix energizes a unique combination of the column conductors thereof.

The column conductors 44 through 53 of the "and" matrix 5a are electrically connected to the column conductors 60–69 of the "or" matrix 5b preferably as shown and the row conductors 71–74 of the matrix 5b are respectively connected to ground through relays 6–9. Diodes 75 of matrix 5b interconnect various rows and column conductors of the matrix in a manner such that as will be more apparent hereinafter energization of each combination of column conductors of matrix 5b will energize a predetermined unique combination of row conductors thereof and actuate the relays coupled thereto. Diodes 76 of matrix 5b interconnect row conductors 71 through 74 of matrix 5b with row conductor 77 such that as will be more apparent hereinafter, relay 78 will also be energized when any of the row conductors 71 through 74 are energized.

Each of the armatures of the single pole, single throw relays 6 through 9 are connected to the positive 25 volt supply line 56. The contacts 6a through 9a of relays 6 through 9 are respectively connected to the variable armatures or poles of switch banks A–D of digit control sequence switch 10, whereas the contact 78a of relay sequence switch 78 is normally electrically connected to ground through the advancing winding 10a of sequence switch 10. The second contact positions of the several banks of switches 10A to 10D complete circuits from the positive 25 volt supply line 56 respectively through the armatures and contacts of relays 6–9 and energizing windings 79–82 of the "units" potentiometer control relay 11A to ground. Similarly, the third and fourth contact positions of the various banks of switch 10 complete circuits from the positive 25 volt supply line 56 through the armatures and contacts of relays 6–9 and the energizing windings 83–90 of relays 11B and 11C to ground. Obviously, additional contact positions of switch 10 could be used for control of additional sets of relays which, as will be more apparent hereinafter, could control tenths, thousandths, ten-thousandths and other orders of magnitude of resistance potentiometer 12.

Control potentiometer 12 comprises successive groups of resistors connected in electrical series wherein each group includes four resistors having a 4–2–2–1 relation of ohmic value. More specifically, potentiometer 12 consists of a first pair of so-called "units" groups of resistors which include the four ohm resistors 79a and 79b, the two ohm resistors 80a and 80b, the two ohm resistors 81a and 81b, and the one ohm resistors 82a and 82b, a second pair of so-called "tens" group of resistors which include the 40 ohm resistors 83a and 83b, the 20 ohm resistors 84a and 84b, the 20 ohm resistors 85a and 85b and 10 ohm resistors 86a and 86b, and a third pair of so-called "hundreds" groups of resistors which include the 400 ohm resistors 87a and 87b, the 200 ohm resistors 88a and 88b, the 200 ohm resistors 89a and 89b, and the 100 ohm resistors 90a and 90b. Control potentiometer 12 is energized by a circuit which extends from the positive 25 volt supply line 56 to armature 10C through resistors 79b through 90b, conductor 91 and resistors 79a through 90a to ground. Each of the relays 79 through 90 includes an armature which when in its energized position shorts out one resistor of the resistor section of potentiometer 12 that includes resistors 79b–90b and at the same time disconnects a short across a resistor of equal ohmic value in the other resistor section of potentiometer 12 that includes resistors 79a–90a. Thus, for example, when relay 90 is energized resistor 90b is shorted out and resistor 90a becomes an effective resistive section of potentiometer 12. In this way as will be more apparent hereinafter, the effective electrical voltage level of output conductor 91 of potentiometer 12 is varied and controlled by suitable energization or deenergization of relays 79–90.

Conductor 91 is electrically connected to the armature of channel selector switch device 13 through contact 93a of its "read" relay 93 and as will be more apparent hereinafter delivers pulses of predetermined magnitude to the various voltage responsive control output lines 14, 18 and 19. Column conductor 54 of matrix 5a is electrically connected through conductor 94 to the reset winding 10b of the sequence switch relay 10 and the reset winding 11d of the potentiometer control relays 79 through 90, whereas column conductor 55 of matrix 5a is electrically connected to winding 10b and 11d and to the reset winding 92a of channel selector relay 13. Aramature 10c of sequence switch relay 10 is connected to the positive 25 volt supply line 56 whereas its various switch contacts 2 through 5 are connected through lamps or indicators 95 to ground. Switch contact 5 of switch bank 10E is also electrically connected to ground through the "read" control winding 93 of channel selector switch device 13.

An alternate embodiment of the tape reader device 4 is illustrated in FIGURE 5 of the drawing. As shown therein, the matrix input leads 28' and 29' are adapted to be switched between ground and the positive supply line 39' by means of the double pole, double throw relay 30'. The spring biased contact element 27' either opens or closes the relay energizing circuit between the supply line 39' and ground depending upon the presence or absence of an aperture in the tape 3'. Selection of the input leads of the decoding matrix in this manner has been found particularly reliable.

In the operation of the above described apparatus of FIG. 3 as tape 3 is fed between the various base plates 26 and the contact members 27 of the preferred embodiment tape reading apparatus of FIG. 4, various combinations of the row conductors of the "and" matrix 5a are lifted from approximately ground potential to a positive value of 10 volts. Thus, for example, when the contact members 27 of the tape reader are positioned as shown in FIGURE 4 of the drawing by a given column of perforations in tape 3, conductors 35 and 37 are electrically connected to the positive 10 volt supply line 39 through resistor 40. Conductors 29, 31, 33, 34 and 36, however, remain at approximately ground potential due to the flow of current between the positive 25 volt supply line 56 and the negative 25 volt supply line 41 through resistors 57 and 43 which are substantially equal in resistance. When the row conductors of the "and" matrix 5a, which are coupled by means of the diodes 59 to any one of the column conductors of matrix 5a, are electrically connected to the positive 10 volt supply line 39, the potential of that column conductor is also increased to 10 volts. Thus, in FIGURE 3 of the drawing it is seen that as the potential of row conductors 35 and 37 is increased from ground toward a positive value of 10 volts, the potential of column conductor 51 of the "and" matrix 5a and the column conductor 67 of the "or" matrix 5b are similarly increased. Row conductors of matrix 5b which are coupled to any of its energized column conductors are then similarly energized through diodes 75. Thus, in FIGURE 3 of the drawing, energization of the column conductor 67 of matrix 5b causes energization of its row conductors 71, 73 and 74 and energization of relays 6, 8 and 9 respectively coupled thereto. Since an increase in potential of any row conductors of matrix 5b causes a similar increase of potential of conductor 77 through the diodes 76, relay 78 connected to conductor 77 is also energized.

Energization of relay 78 and closure of its contact 78a energizes the advance winding 10a of the digit sequence switch 10 causing the armatures of its various banks of contacts 10A to 10E to move from their first to their second contact positions. Contacts 6a, 8a and 9a of relays 6, 8 and 9, which are slower acting than relay 78, then close thereby energizing a predetermined combination of the windings 79–82 of the "units" section of control device 11A. Thus, relays 79, 81 and 82 in the "units" section of potentiometer control device 11A are energized. Closure of the armatures of relays 79, 81 and 82 shorts out resistors 79b, 81b and 82b of potentiometer 12 and opens the electrical short circuit across resistors 79a, 81a, and 82a. Thus, the effective resistance of that portion of potentiometer 12 between the positive 25 volt supply line 56 and the output conductor 91 is decreased 7 ohms due to the short circuits connected across the 4 ohm resistor 79b, the 2 ohm resistor 81b, and the 1 ohm resistor 82b and the effective resistance of that portion of potentiometer 12 between the output conductor 91 and ground is increased 7 ohms due to the disconnected short circuits across the 4 ohm resistors 79a, the 2 ohm resistor 81a, and the 1 ohm resistor 82a.

As tape 3 is fed through the tape reader 4 and as each succeeding column of perforations in tape 3 repositions the contact members 27 with respect to the base plates 26, the potential of other combinations of row conductors 28–37 of matrix 5a is increased from ground toward a positive value of 10 volts, and relays 6–9 are energized through diodes 59 and 75 or remain deenergized in accordance with the decoding system of matrices 5a and 5b. The state of energization or deenergization of relays 6–9 during these succeeding decoding operations determine the manner in which "tens" control relays 83–86 and the "hundreds" control relays 87–90 respectively short out or cut in resistor sections 83–86 and 87–90 of the potentiometer 12. Thus, if in FIGURE 3 of the drawings relays 6, 7 and 8 are energized by the second column of perforations punched at 20, 23 and 24 in tape 3, the relatively fast acting windings 10a of sequence switch 10, which is also energized through diodes 76, advances the armatures of banks A–E thereof to their third contact positions and relays 83, 84 and 85 of the potentiometer control device 11B shorts out resistors 83b, 84b and 85b and cuts in resistors 83a, 84a and 85a. This further increases the effective resistance of the portion of potentiometer 12 between the output conductor 91 and ground. Similarly, if relays 6 and 9 are energized by the third column of perforations in tape 3, winding 10a of switch 10 is again energized, the armatures of switch 10 are advanced to their fourth contact positions, such that relays 87 and 90 are energized, resistors 87b and 90b are shorted out and resistors 87a and 90a are cut into the potentiometer circuit. This still further increases the effective resistance of the portion of potentiometer 12 between the output conductor 91 and ground.

When winding 10a of sequence switch 10 is energized on columns 44 and 60 of matrices 5a and 5b by the next column of perforations on tape 3, the armature of contact bank E of switch 10 is advanced to its fifth contact position and advance winding 92 and slower acting read winding 93 are energized by a circuit that extends from the positive 25 volt supply line 56 through the armature of bank E of switch 10 and relays 92 and 93 to ground. This advances the armature of the channel selector device 13 from its first to its second contact position, and the voltage responsive device 15 on output line 14 is energized.

The next following column of perforations on tape 3 energizes column conductors 54 of matrix 5a and reset winding 10b of the sequence switch 10 and winding 11d which unlatches the potentiometer control relays 79–90 such that the cycle above described may be repeated and the voltage responsive device on the second output line 18 may be energized. When each of the output channels of the system has been energized, an additional column of perforations on tape 3 increases the potential of conductor 55 of matrix 5a, reset winding 92a of the channel selector device 13 is energized, its armature is returned to its first contact position, and the entire cycle is repeated. It is therefore seen that by means of the above described apparatus the various voltage responsive pneumatic valves 15–17 or any other suitable industrial devices or the like are efficiently and reliably controlled by programmed data stored on a tape or any other suitable storage device.

An alternate embodiment of the above described potentiometer control device 11 is illustrated in FIGURE 6 of the drawing. As shown therein, prior to energization of any of the "units" relays 11A', the "tens" relays 11B', or the "hundreds" relays 11C', all of the resistors 79"–90" are disposed in the potentiometer circuit between the positive 25 volt supply line 56' and the output conductor 91' and output conductor 91' is shorted to ground. When, however, one of the potentiometer control relays 79'–90' is energized, the resistor associated therewith is repositioned in the potentiometer circuit so as to increase the resistance of the portion of the potentiometer between output conductor 91' and ground. Thus, for example, if relay 79' were energized its four armatures would be actuated and moved from their left contact energizing positions to their right contact energizing positions such that the potentiometer circuit would then extend from the positive 25 volt supply line 56' through resistors 80"–90" to conductor 91' and from conductor 91' through resistor 79" to ground. Similarly, if any one or more other of the potentiometer control relays were energized, their associated resistor 80"–90" would also be repositioned in the potentiometer circuit so as to register a suitable charge of potential in the output circuits of the above described apparatus.

Figure 7:
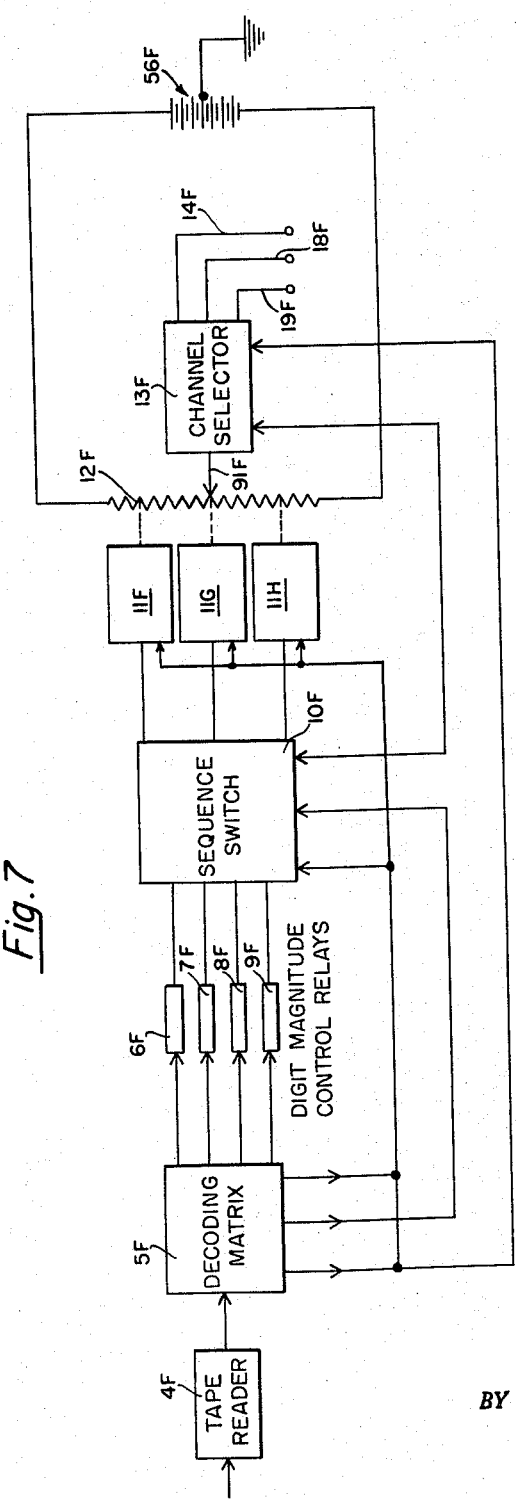
FIGURE 7 is a diagrammatic view of another preferred embodiment of the invention.

An alternate embodiment of the potentiometer energizing and output circuits of the present invention is illustrated in FIGURE 7 of the drawing. As shown therein, control of potentiometer 12F is obtained by means of the tape reader 4F, the decoding matrix 5F, the digit control relays 6F–9F, the sequence switch 10F and the potentiometer control relays 11F–11H in the manner described above. Potentiometer 12F in this embodiment of the invention, however, is driven by the power source 56F which is center tapped to ground. In this way the effective tap position of conductor 91F which couples potentiometer 12F with the channel selector 13F and the output lines 14F, 18F and 19F may be varied in magnitude in either a positive or a negative direction and more complete regulation of the device to be controlled may be obtained.

Obviously many modifications and variations of the present invention are possible in the light of the above teachings. It is to be understood that within the scope of the appended claims the invention may be practiced otherwise than as specifically described.

What is claimed is:

1. A control system comprising, in combination, a decade potentiometer including a separate section for each digital order with each section progressively differing from the other sections in electrical resistivity by a factor of substantially 10, each section of the potentiometer being further subdivided into four sub-sections of proportional resistivity, and distributor switch means connectable to the digital order sections of the potentiometer and being operable to short out any selective combination in the subsections of the potentiometer simultaneously, and program scanner means for developing an electrical potential across the remaining unshorted sub-sections of the potentiometer for controlling one of a plurality of utilization devices.

2. A control system comprising, in combination, a decade potentiometer divided into two serially connected major divisions of substantially equal resistivity, each division of said potentiometer being further similarly divided into separate sections each representative of a digital order progressively differing from the others of its division in electrical resistivity by a factor of substantially 10, each of said sections of the potentiometer being further divided into four sub-sections of proportional resistivity, and distributor switch means separately associated with the corresponding digital order sections of the two divisions of the potentiometer and operable for shorting any selective combination of the sub-sections of one division of the potentiometer while effective at the same time for including the corresponding subsections of the other division in the potentiometer.

3. A control system comprising, in combination, a decade potentiometer divided into two serially connected major divisions of substantially equal resistivity, each division of said potentiometer being further similarly divided into separate sections each representative of a digital order progressively differing from the others of its division in electrical resistivity by a factor of substantially 10, each of said sections of the potentiometer being further divided into four sub-sections of proportional resistivity, distributor switch means separately associated with the corresponding digital order sections of the two divisions of the potentiometer and operable for shorting any selective combination of the sub-sections of one division of the potentiometer while effective at the same time for including the corresponding sub-sections of the other division in the potentiometer, and means for developing an electrical potential across one of said divisions of the potentiometer and employing the resulting potential to control one of a plurality of utilization devices.

4. A potentiometer control system comprising, in combination, a decade potentiometer divided into two serially connected major divisions of substantially equal resistivity arranged as a voltage divider, a constant voltage source connectable across the end terminals of the major and minor divisions, an output terminal connected between said divisions, each division of said potentiometer being further similarly divided into separate sections each representative of a digital order progressively differing from other sections of its division by an electrical resistivity factor of substantially 10, each of said sections of said potentiometer being further divided into resistive elements, relay switch means associated with like elements of similar digital order sections, means for controlling the relay switch means associated with similar digital order sections to switch in elements in one section of one division and switch out elements in a similar digital order section of the other division, distributor switch means for determining the digital order section to be controlled by the relay switch controlling means, a program scanner means associated with the distributor means for indicating which digital order section is operable and applying the voltage supply level to the potentiometer and connecting the output terminal to the voltage divider, whereby a predetermined voltage level sequentially set in the voltage divider is read out to a utilization means.

5. In a potentiometer control system, a decade potentiometer divided into two serially connected divisions of equal resistivity having a constant voltage supply connected across the end terminals and an output connected therebetween, each division further divided into sections representative of digital orders, a plurality of equal resistance pairs in said sections having one resistance element in each of the divisions, a plurality of relays in groups for operating shorting contacts to short out one resistance element of a pair and disconnecting a short across the other resistance element of a pair, a distributor for scanning the relay groups and synchronizing a source of input signals to a specific group of relays, a sequence stepping switch controlled by input signals for advancing the distributor to a different group of relays, a channel selector operable to select any one of a plurality of output utilization means, and a read write indicator switch controlled by input signals for energizing the channel selector and causing the channel selector to connect the output to a predetermined one of the utilization means.

6. A potentiometer control system according to claim 4 in which the distributor includes a reset means which is operable for resetting the sequence stepping switch.

7. A potentiometer control system according to claim 4 in which the decade potentiometer includes a reset means operable to disconnect the settings of the relay groups.

8. A potentiometer control system according to claim 4 including reset means associated with the distributor and potentiometer simultaneously operable to reset the potentiometer and the distributor.

9. A potentiometer control system according to claim 4 including reset means associated with the potentiometer and distributor and simultaneously operable to reset the potentiometer, the distributor and the channel selector.

10. A potentiometer control system comprising a plurality of input leads, a single pole single throw relay connected for actuation to each of said input leads, a multiple pole multiple throw sequence switch successively movable from pole to pole thereof; means for stepping the sequence switch from pole to pole thereof; means connecting the single throw contact position of each of said relays to individual poles of the sequence switch; a potentiometer having a pair of end terminals and an output voltage tap terminal, said potentiometer comprising a first group of series connected "units" resistors connected between one of the end terminals of the potentiometer and and its tap terminal, a second group of series connected "units" resistors connected between the other of the end terminals of the potentiometer and its tap terminal; first and second groups of series connected "tens" and "hundreds" resistors respectively connected in series with the first and second groups of "units" resistors, the first group "units," "tens," and "hundreds" resistors and the second group "units," "tens," and "hundreds" resistors having ohmic values which additively provide incremental variations of total group resistance between zero and a maximum ohmic value as various combinations of the resistors of each group are short circuited; a group of "units" potentiometer control relays connected for actuation to a corresponding contact position of each of the poles of the sequence switch; groups of "tens" and "hundreds" potentiometer control relays connected for actuation to other corresponding contact positions of each of the poles of the sequence switch, each of the said potentiometer control relays having a de-energized contact position which shorts out one of the second group resistors and an energized contact position which opens the short circuit across the second group resistor and establishes a short circuit across a first group resistor having equal ohmic value; means for reading an output voltage from the potentiometer after the potentiometer control relays have been preconditioned in accordance with signals received on said input leads; and means for restoring the potentiometer control relays and the sequence switch to predetermined original control positions.

11. A potentiometer control system comprising a plurality of input leads, a single pole single throw relay connected for actuation to each of said input leads, a multiple pole multiple throw sequence switch successively movable from pole to pole thereof; means for stepping the sequence switch from pole to pole thereof; means connecting the single throw contact position of each of said relays to individual poles of the sequence switch; a potentiometer electrically connectable across an electrical energy supply source, said potentiometer including a plurality of resistive elements having ohmic values which additively provide an incremental variation of the total resistance between the terminals of the potentiometer when connected in various combinations in series; and potentiometer control means connected for actuation to corresponding contact positions of each of the poles of the sequence switch, each said control means being adapted to insert individual resistive elements into the potentiometer.

12. A potentiometer control system comprising a plurality of input leads, a single pole single throw relay connected for actuation to each of said input leads, a multiple pole multiple throw sequence switch capable of successive advancement from pole to pole thereof; means for stepping the sequence switch from pole to pole thereof; means connecting the single throw contact position of each of said relays to individual poles of the sequence switch; an electrical energy supply source having a center tap which is connected to ground; a potentiometer having a pair of end terminals and an output voltage tap terminal, said potentiometer comprising a first group of series connected resistive elements connected between one of the end terminals of the potentiometer and its output voltage tap terminal, each of the resistive elements of the said first group having ohmic values which additively provide an incremental variation of the total resistance of the potentiometer when predetermined combinations thereof are short circuited; a second group of series connected resistive elements connected between the other of the end terminals of the potentiometer and its output voltage tap terminal, the component resistive elements of the second group being equal in number and ohmic value to the resistive elements of the first group; a plurality of potentiometer control relays each individually connected to a different pole of the sequence switch and effective when the sequence switch is in contact position for its pole for disconnecting the short circuit across any of the resistive elements of the second group and shorting out the resistive element of the first group having equal ohmic value.

13. A control system comprising, in combination, a decade potentiometer including a separate section for each digital order with each section progressively differing from the other sections in electrical resistivity by a factor of substantially 10, each section of the potentiometer being further subdivided into a like number of corresponding subsections of proportional resistivity, and distributor stepping switch means connectible to the digital order sections of the potentiometer and being operable successively in order of time to vary the ohmic value of each of corresponding sub-sections of the potentiometer simultaneously, a plurality of output channels, and an output channel switch device for connecting developed electrical potentials across the sub-sections of the potentiometer in successive order to the output channels.

14. A potentiometer control system comprising a plurality of input leads, a relay operated switch connected for actuation to each of said input leads, a sequence stepping switch device having a plurality of contact arms each movable over a similar set of contact poles, means connecting each of said relay operated switches to individual arms of the sequence switch, a decade potentiometer divided into two serially connected major divisions of substantially equal resistivity, each division of said potentiometer being further similarly divided into separate sections each representative of a digital order progressively differing from the others of its division in electrical resistivity by a factor of substantially 10, each of said sections of the potentiometer being further divided into a like number of sub-sections of proportional resistivity, separate potentiometer control means associated with the corresponding digital order sections of the two divisions of the potentiometer and operable for shorting any selective combination of the sub-sections of one division of the potentiometer while effective at the same time for including the corresponding sub-sections of the other division in the potentiometer, means connecting each of said potentiometer control means to corresponding poles of the sequence switch device, and means for developing an electrical potential across one of said divisions of the potentiometer and employing the resulting potential to control a utilization device.

15. In a control system a potentiometer having a pair of end terminals and an output voltage tap terminal, said potentiometer comprising a first group of series connected "units" resistors connected between one of the end terminals of the potentiometer and its tap terminal; a second group of series connected "units" resistors connected between the other of the end terminals of the potentiometer and its tap terminal; first and second groups of series connected "tens" and "hundreds" resistors respectively connected in series with the first and second groups of "units" resistors, the first group "units," "tens," and "hundreds" resistors and the second group "units," "tens," and "hundreds" resistors having ohmic values which additively provide step-by-step variations of total group resistance between zero and one-thousand ohms as various combinations of the resistors of each group are short circuited; means normally short circuiting each of the second group "units," "tens," and "hundreds" resistors; and means for disconnecting the short circuit of any of the second group resistors and simultaneously short circuiting a first group resistor having equal ohmic value, said last means including a sequence distributor switch having contacts separately associated with each said short circuiting means and operable successively in order of time to short circuit the "units," "tens," and "hundreds" resistors of the said first groups of resistors.

16. In a control system a potentiometer having a pair of end terminals and an output voltage tap terminal, said potentiometer comprising a first group of series connected "units" resistors connected between one of the end terminals of the potentiometer and its tap terminal; a second group of series connected "units" resistors connected between the other of the end terminals of the potentiometer and its tap terminal; first and second groups of series connected "tens" and "hundreds" resistors respectively connected in series with the first and second groups of "units" resistors, the first group "units," "tens," and "hundreds" resistors and the second group "units," "tens," and "hundreds" resistors having ohmic values which additively provide step-by-step variations of a given total group resistance as various combinations of the resistors of each group are short circuited; means normally short circuiting each of the second group "units," "tens," and "hundreds" resistors; and means for disconnecting the short circuit of any of the second group resistors and simultaneously short circuiting a first group resistor having equal ohmic value, said last means including a plurality of input leads, a single pole single throw relay connected for actuation to each of said input leads, a multiple pole multiple throw sequence switch capable of successive advancement from pole to pole thereof, means for stepping the sequence switch from pole to pole thereof, and means connecting the single throw contact position in each of said relays to individual poles of the sequence switch whereby the sequence switch is operable successively in order of time to short circuit the "units," "tens," and "hundreds" resistors of the said first groups of resistors.

References Cited in the file of this patent

UNITED STATES PATENTS

| | | |
|---|---|---|
| 2,423,463 | Moore | July 8, 1947 |
| 2,538,826 | Avery | Jan. 23, 1951 |
| 2,573,280 | Schmidt | Oct. 30, 1951 |
| 2,752,093 | Bush et al. | June 26, 1956 |
| 2,762,038 | Lubkin | Sept. 4, 1956 |
| 2,775,754 | Sink | Dec. 25, 1956 |
| 2,784,369 | Fenemore et al. | Mar. 5, 1957 |
| 2,799,821 | Hannig | July 16, 1957 |